(12) United States Patent
Polaganga

(10) Patent No.: US 12,245,231 B2
(45) Date of Patent: Mar. 4, 2025

(54) SYSTEM AND METHOD FOR DYNAMICALLY ADJUSTING IN-BAND CARRIERS

(71) Applicant: T-Mobile Innovations LLC, Overland Park, KS (US)

(72) Inventor: Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 476 days.

(21) Appl. No.: 17/748,305

(22) Filed: May 19, 2022

(65) Prior Publication Data
US 2023/0413266 A1    Dec. 21, 2023

(51) Int. Cl.
*H04W 72/1273* (2023.01)
*H04W 88/10* (2009.01)

(52) U.S. Cl.
CPC ........ *H04W 72/1273* (2013.01); *H04W 88/10* (2013.01)

(58) Field of Classification Search
CPC .................. H04W 72/1273; H04W 882/10
USPC ..................................... 455/452.1
See application file for complete search history.

(56) References Cited

U.S. PATENT DOCUMENTS

| 10,477,367 B2 | 11/2019 | Blankenship et al. |
| 10,973,027 B2 | 4/2021 | Gupta et al. |
| 2011/0319032 A1* | 12/2011 | Pica ............... H04B 17/318 455/67.11 |
| 2022/0330062 A1* | 10/2022 | Zaphir ............. H04W 24/08 |

\* cited by examiner

*Primary Examiner* — Ted M Wang

(74) *Attorney, Agent, or Firm* — Jones Robb, PLLC

(57) ABSTRACT

Systems, methods, and processing nodes for managing network resources perform and/or comprise: setting a first trigger criteria for an access node, wherein the access node is configured to communicate over a wideband including a first bandwidth portion and is configured to communicate in both of a first communication mode and a second communication mode; scheduling communications in the first communication mode over the first bandwidth portion; monitoring a usage parameter in at least one of the first communication mode or the second communication mode; and in response to a first determination that the usage parameter corresponds to the first trigger criteria for at least a first predetermined amount of time: identifying a second bandwidth portion within the wideband, and scheduling communications corresponding to the first communication mode over the first bandwidth portion and the second bandwidth portion.

20 Claims, 6 Drawing Sheets

SYSTEM AND METHOD FOR DYNAMICALLY ADJUSTING IN-BAND CARRIERS

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Additionally, in recent years, networks have evolved to connect using the Internet-of-Things (IoT), which describes the network of physical objects or things that are embedded with sensors, software, and other technologies for the purpose of connecting and exchanging data with other devices and systems over the Internet. Cellular IoT is a way of connecting physical devices such as sensors to the internet by having them utilize the same mobile networks as wireless devices. In the consumer market, IoT technology is frequently utilized to equip the "smart home," including devices and appliances such as lighting fixtures, thermostats, home security systems and cameras, and other appliances which support one or more common ecosystems, and can be controlled via devices associated with that ecosystem, such as smartphones and smart speakers. Cellular IoT itself is a rapidly growing ecosystem based on 3rd Generation Partnership Project (3GPP) global standards, supported by an increasing number of mobile network providers as well as device, chipset, module, and network infrastructure vendors. Cellular IoT improves over other Low Power Wide Area (LPWA) network technologies in terms of quality of service (QoS), scalability, flexibility, and the like.

Some cellular IoT applications operate via a Category M1 (Cat-M1) protocol, which is a 3GPP standardized technology. Cat-M1 operates at 1.4 MHz bandwidth with higher device complexity/cost than some other IoT technologies such as Narrowband IoT (NB-IoT). The wider bandwidth allows Cat-M1 to achieve greater data rates (up to 1 megabit per second (Mbps)), lower latency, and more accurate device positioning capabilities. Cat-M1 supports voice calls and connected mode mobility. Exemplary use cases for Cat-M1 include connected vehicles, wearable devices, trackers, and alarm panels. Cat-M1 devices can exist in a sleep mode for extended periods of time, which greatly reduces device power consumption.

Certain network operators provide services via multiple RATs simultaneously. For example, a network operator may provide both Cat-M1 and LTE/NR services simultaneously via the same access nodes and within the same frequency bands. Thus, a large number of diverse UEs may be simultaneously connected to an access node, with IoT devices occupying Cat-M1 frequency resources and cellular devices occupying LTE/NR frequency resources within the same frequency band.

Overview

Various aspects of the present disclosure relate to systems and methods of managing network resources (e.g., by dynamically allocating and de-allocating frequency resources to various RATs) in a telecommunications network.

In one exemplary aspect of the present disclosure, a method of managing network resources comprises setting a first trigger criteria for an access node, wherein the access node is configured to communicate over a wideband including a first bandwidth portion and is configured to communicate in both of a first communication mode and a second communication mode; scheduling communications in the first communication mode over the first bandwidth portion; monitoring a usage parameter in at least one of the first communication mode or the second communication mode; and in response to a first determination that the usage parameter corresponds to the first trigger criteria for at least a first predetermined amount of time: identifying a second bandwidth portion within the wideband, and scheduling communications corresponding to the first communication mode over the first bandwidth portion and the second bandwidth portion.

In another exemplary aspect of the present disclosure, a system for managing network resources comprises an access node configured to communicate over a wideband including a first bandwidth portion and configured to communicate in both of a first communication mode and a second communication mode, the access node including at least one electronic processor configured to perform operations including: setting a first trigger criteria for the access node; scheduling communications in the first communication mode over the first bandwidth portion; monitoring a usage parameter in at least one of the first communication mode or the second communication mode; and in response to a first determination that the usage parameter corresponds to the first trigger criteria for at least a first predetermined amount of time: identifying a second bandwidth portion within the wideband, and scheduling communications corresponding to the first communication mode over the first bandwidth portion and the second bandwidth portion.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
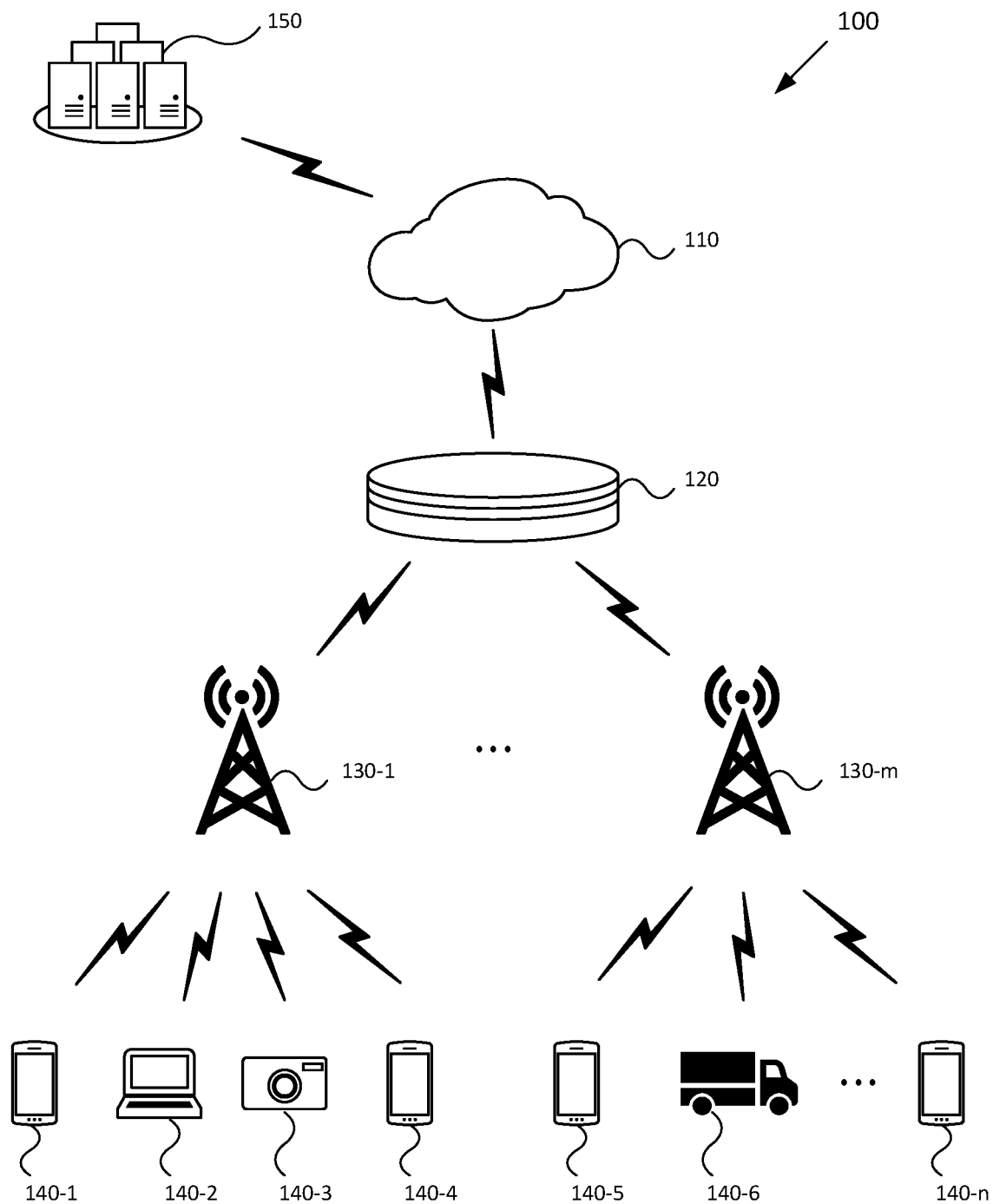
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

In accordance with various aspects of the present disclosure, a cellular or wireless network may be provided by an access node. The access node may utilize one or more antennas to communicate with wireless devices or UEs, including both cellular UEs and IoT UEs. Cat-M1 IoT service may be implemented in either a standalone band or within an LTE or NR band ("in-band") occupying a bandwidth of 1.4 MHz. In an in-band implementation, a portion of the resources in a wideband is thus allocated to Cat-M1 service, with the remaining portion being allocated to LTE or NR service (or combinations thereof, for example using Dynamic Spectrum Sharing (DSS)). As Cat-M1 adoption increases and more Cat-M1 devices access a network there exists and increasing need to address the capacity required to support the large amount of devices within the limited 1.4 MHz of bandwidth. At the same time, the remaining LTE or NR resources may be underutilized. This capacity issue may exist where Cat-M1 is implemented in-band with LTE, and there is high Cat-M1 traffic and low LTE traffic (e.g., due to increased NR adoption in the service area); or where Cat-M1 is implemented in-band with NR, and there is high Cat-M1 traffic and low NR traffic (e.g., due to poor NR adoption in the service area). As newer voice-supported Cat-M1 applications become implemented, many of which require Guaranteed Bit Rate (GBR) service, there exists a need to improve the usage of radio resources for all traffic types.

Accordingly, the present disclosure provides for systems, methods, and devices which implement the dynamic adjustment of in-band carriers, including the dynamic assignment of in-band carriers to different RATs based on spectrum utilization. Various aspects of the present disclosure provide for the dynamic allocation of additional carriers to Cat-M1 where Cat-M1 resources are being overutilized and/or for the dynamic de-allocation of carriers from Cat-M1 where Cat-M1 resources are being underutilized. Thus, various aspects of the present disclosure improve Cat-M1 UE performance, provide improved utilization of resources (e.g., better spectral efficiency, and/or improved battery usage.

For purposes of illustration and explanation, various portions of this detailed description refer to implementations in a network using Cat-M1 and 5G NR RATs concurrently; however, the present disclosure is not so limited. The systems and methods described herein may be implemented where any IoT RAT capable of in-band resource allocation is implemented concurrently with any RAT or combinations of RATs in which TDD communications may be implemented, including but not limited to 3G RATs such as GSM, UMTS, CDMA, etc.; 4G RATs such as WiMAX, LTE, etc.; 5G RATs such as NR; and further extensions or updated implementations of the same.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on. The term "wireless device" is used interchangeably with the term "wireless communication device" herein.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with a 5G NR gNodeB.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an NR cloud platform and/or an IoT cloud platform, may perform processing and forward results to the computing systems and devices 150 and/or the wireless devices 140. The core network 120, which may be a 5G Core Network (5GCN) and/or an IoT core network, connects with the cloud platform 110 and the access nodes 130. Examples of the core network and/or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
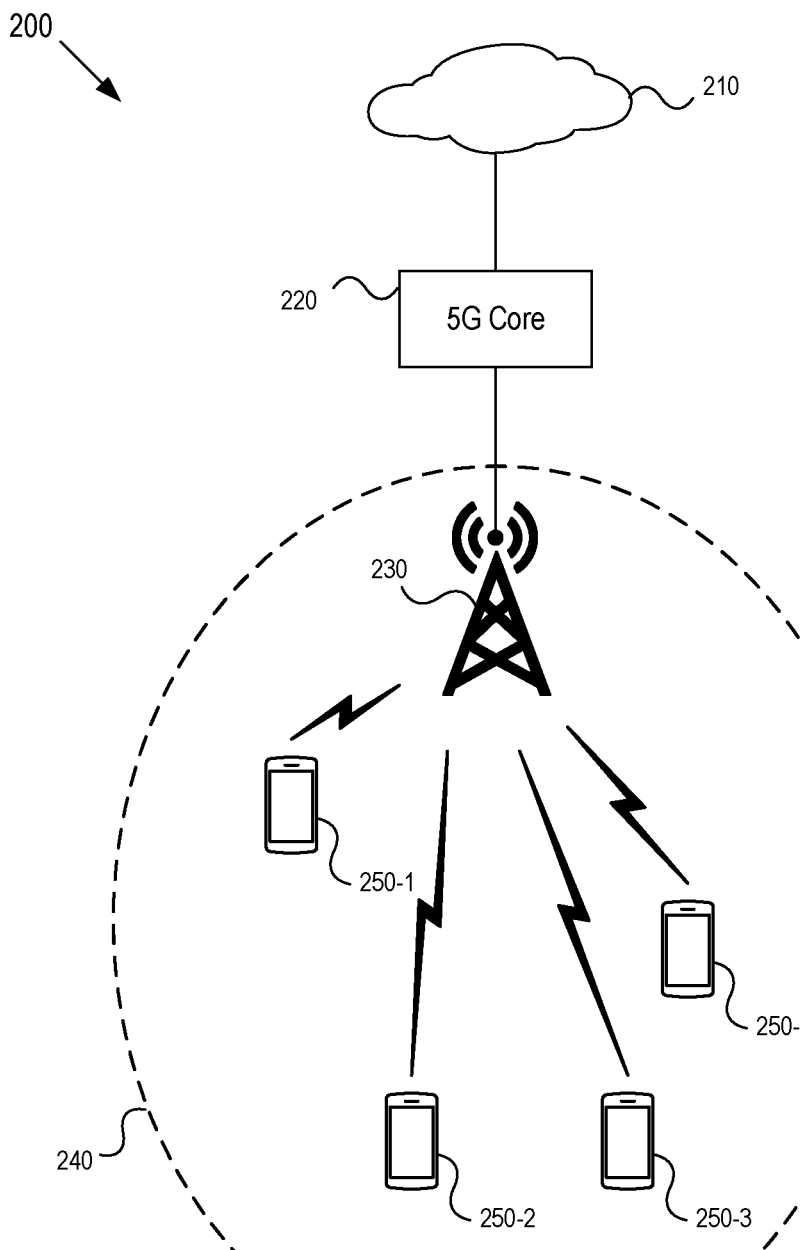
FIG. 2 illustrates an exemplary configuration of a system for wireless communication in accordance with various aspects of the present disclosure.

FIG. 2 illustrates a configuration in which a system 200 provides coverage via an access node within a particular area. For purposes of illustration and explanation, the system 200 is illustrated as a combination of Cat-M1 and a 5G System (5GS); however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

As illustrated, the system 200 comprises a communication network 210, a 5G core 220, an access node 230 which provides service in a coverage area 240, and a plurality wireless devices 250-1 to 250-4 (collectively referred to as wireless devices 250). For purposes of illustration and ease of explanation, only one access node 230 and four wireless device 250 are shown in the system 200; however, as noted above with regard to FIG. 1, additional access nodes and/or additional or fewer wireless devices may be present in the system 200. In the illustration of FIG. 2, the access node 230 is connected to the communication network 210 via an NR path (including the 5G core 220); however, in practical implementations the access node 230 may be connected to the communication network 210 via multiple paths (e.g., using multiple RATs). The access node 230 communicates with the 5G core 220 via one or more communication links, each of which may be a direct link (e.g., an N2 link, an N3 link, or the like). The access node 230 may also communicate with additional access nodes via a direct link.

A scheduling entity may be located within the access node 230 and/or the 5G core 220, and may be configured to accept and deny connection requests and manage communication sessions (e.g., TDD sessions), to allocate resources and RATs to improve overall network resource utilization and performance, and the like. The access node 230 may be any network node configured to provide communications between the connected wireless devices and the communication network 210, including standard access nodes and/or short range, lower power, small access nodes. As examples of a standard access node, the access node 230 may be a macrocell access node, a base transceiver station, a radio base station, a gNodeB in 5G networks, an eNodeB in 4G/LTE networks, or the like, including combinations thereof. In one particular example, the access node 230 may be a macrocell access node in which a range of the coverage area 240 is from approximately five to thirty-five kilometers (km) and in which the output power is in the tens of watts (W). As examples of a small access node, the access node 230 may be a microcell access node, a picocell access node, a femtocell access node, or the like, including a home gNodeB or a home eNodeB.

The access node 230 can comprise one or more processors and associated circuitry to execute or direct the execution of computer-readable instructions such as those described herein. In so doing, the access node 230 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 230 can receive instructions and other input at a user interface.

Figure 3:
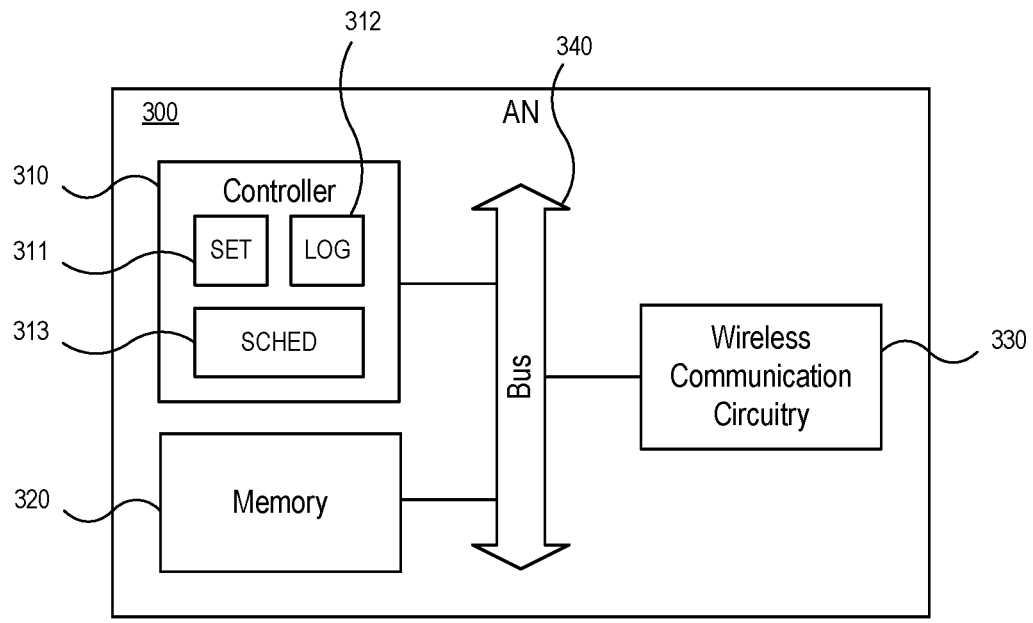
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 230 shown in FIG. 2. The access node 300 may be configured to communicate over a wideband including a first bandwidth portion (e.g., a first carrier or narrowband) and a second bandwidth portion (e.g., a second carrier or narrowband) in both of a first communication mode (e.g., a Cat-M1 mode) and a second communication mode (e.g., an LTE or NR mode). As illustrated the access node 300 includes a controller 310, a memory 320, wireless communication circuitry 330, and a bus 340 through which the various elements of the access node 300 communicate with one another. The controller 310 may include sub-modules or units, each of which may be implemented via dedicated hardware (e.g., circuitry), software modules which are loaded from the memory 320 and processed by the controller 310, firmware, and the like, or combinations thereof. These include a setting module 311, a logic module 312, and a scheduling module 313. Some or all of the sub-modules or units may physically reside within the controller 310, or may instead reside within the memory 320 and/or may be provided as separate units within the access node 300.

While FIG. 3 illustrates the setting module 311, the logic module 312, and the scheduling module 313 as being separate modules, in practical implementations some of the modules may be combined with one another and/or may share components. Through the use of the setting module 311, the logic module 312, and the scheduling module 313, the access node 300 (e.g., the controller 310) may be configured to perform various operations to implement methods in accordance with the present disclosure. While one example of operations performed by the modules is described here, in practical implementations at least some of the operations described as being performed by one module may instead be performed by another module, including a module not explicitly named here.

The setting module 311 may be configured to set various trigger criteria and/or thresholds. For example, the setting module 311 may be configured to set or define a first trigger criteria for the access node 300. The setting module 311 may additionally be configured to set or define a second trigger criteria for the access node 300. The various trigger criteria may additionally include time parameters; for example, a predetermined amount of time for which a respective trigger criteria must exist in order for the trigger criteria to be deemed satisfied. The duration of the amount of time may be defined by an operator of the access node 300.

The first trigger criteria may comprise a condition that a first number of devices connected to the access node 300 using the first communication mode is greater than a first threshold and that a second number of devices connected to the access node 300 using the second communication mode is less than a second threshold. In one particular example, the first trigger criteria may thus be met when the number of Cat-M1 UEs connected to the access node 300 is relatively large and the number of LTE or NR UEs connected to the access node 300 is relatively small. The first trigger criteria may additionally or alternatively comprise a condition that a first resource utilization in the first communication mode is greater than a first threshold and that a second resource utilization in the second communication mode is less than a second threshold. In one particular example, the first trigger criteria may thus be met when Cat-M1 resource utilization is relatively high and LTE or NR resource utilization is relatively low. The first trigger criteria may additionally or alternatively comprise a condition that a number of devices connected to the access node 300 using a predetermined sub-mode of the first communication mode is greater than a first threshold and that a resource utilization in the second communication mode is less than a second threshold. In one particular example, the first trigger criteria may thus be met when a number of Cat-M1 users in Coverage Extension (CE) ModeB is relatively high and LTE or NR resource utilization is relatively low.

The second trigger criteria may comprise a condition that a first number of devices connected to the access node 300 using the first communication mode is less than a first threshold and that a second number of devices connected to the access node using the second communication mode is more than a second threshold. In one particular example, the second trigger criteria may thus be met when the number of Cat-M1 UEs connected to the access node 300 is relatively small and the number of LTE or NR UEs connected to the access node 300 is relatively large. The second trigger criteria may additionally or alternatively comprise a condition that a first resource utilization in the first communication mode is less than a first threshold and that a second resource utilization in the second communication mode is greater than a second threshold. In one particular example, the second trigger criteria may thus be met when Cat-M1 resource utilization is relatively low and LTE or NR resource utilization is relatively high. The second trigger criteria may additionally or alternatively comprise a condition that a number of devices connected to the access node 300 using a predetermined sub-mode of the first communication mode is less than a first threshold and that a resource utilization in the second communication mode is more than a second threshold. In one particular example, the second trigger criteria may thus be met when a number of Cat-M1 users in CE ModeB is relatively low and LTE or NR resource utilization is relatively high.

The first trigger criteria and the second trigger criteria may be independent from one another, or may be related to one another. In an example in which the first and second trigger criteria are related to one another, they may be converses of one another. In other words, if the first trigger criteria includes the condition that the first number of devices connected to the access node 300 using the first communication mode is greater than a first threshold and that the second number of devices connected to the access node 300 using the second communication mode is less than a second threshold, then the second trigger criteria may include the condition that the first number of devices connected to the access node 300 using the first communication mode is less than a first threshold and that the second number of devices connected to the access node using the second communication mode is more than a second threshold. In this example, the first and second thresholds for purposes of the first trigger criteria may be the same as or different than the first and second thresholds for purposes of the second trigger criteria. In the example in which the first and second thresholds are the same, the second trigger criteria may thus essentially comprise a condition that the first trigger criteria is no longer satisfied.

The logic module 312 may be configured to perform various logic operations, including but not limited to operations of comparing, monitoring, and identifying various aspects of the network and/or the access node 300. For example, the logic module 312 may be configured to module a usage parameter in at least one of the first communication mode or the second communication mode. The usage parameter may include a number of devices connected to the access node 300 using the first communication mode, a number of devices connected to the access node 300 using the second communication mode, a resource utilization in the first communication mode, a resource utilization in the second communication mode, a number of devices connected to the access node 300 using a predetermined sub-mode of the first communication mode, or combinations thereof. The logic module 312 may be configured to compare the usage parameter to one or more trigger criteria (e.g., those trigger criteria described above as being set by the setting module 311) and output a determination indicating of the comparison result.

The logic module 312 may additionally or alternatively be configured to identify various bandwidth portions within the wideband, which may include sub-operations of identifying a plurality of bandwidth portion candidates within the wideband which meet a capability criteria and selecting, as the second bandwidth portion, the bandwidth portion candidate from among the plurality of bandwidth portion candidates that satisfies a candidacy criteria. The capability criteria and/or the candidacy criteria may be different for downlink (DL) and uplink (UL) bandwidth portions. For example, for DL traffic the capability criteria may include a condition that a bandwidth portion does not have physical resource block (PRB) blanking or IoT in-band capabilities (e.g., NB-IoT in-band or Cat-M1 in-band) already defined; and the candidacy criteria may include a condition that the candidate bandwidth portion is the closest narrowband to a Cat-M1 narrowband that is already defined. In an example, for UL traffic the capability criteria may include a condition that a bandwidth portion does not have Cat-M1 in-band already defined; and the candidacy criteria may include a condition that the candidate bandwidth portion has the lowest narrowband index that does not collide with a wideband Physical Uplink Control Channel (PUCCH) or Physical Random Access Channel (PRACH) in a specific transmission time interval (TTI).

The scheduling module 313 may be configured to implement load balancing, for example by scheduling data corresponding to particular corresponding RATs on carriers allocated to the RAT. For example, the scheduling module 313 may initially be configured to schedule communications in the first communication mode over the first bandwidth portions. Later, in response to the operations of the setting module 311 and/or the logic module 312, the scheduling module 313 may be configured to schedule communications corresponding to the first communication mode over both the first bandwidth portion and the second bandwidth portion. Later still, in response to the operations of the setting module 311 and/or the logic module 312, the scheduling module 313 may be configured to schedule communications corresponding to the first communication mode over only one of the first bandwidth portion and the second bandwidth portion. This may include operations of comparing a identifier index (e.g., the narrowband index) corresponding to the first bandwidth portion with a identifier index corresponding to the second bandwidth portion (which may be performed by the logic module 312 in some implementations), selecting the bandwidth portion having the higher identifier index from among the first bandwidth portion and the second bandwidth portion, and scheduling communications corresponding to the first communication mode over the selected bandwidth portion.

Figure 5:
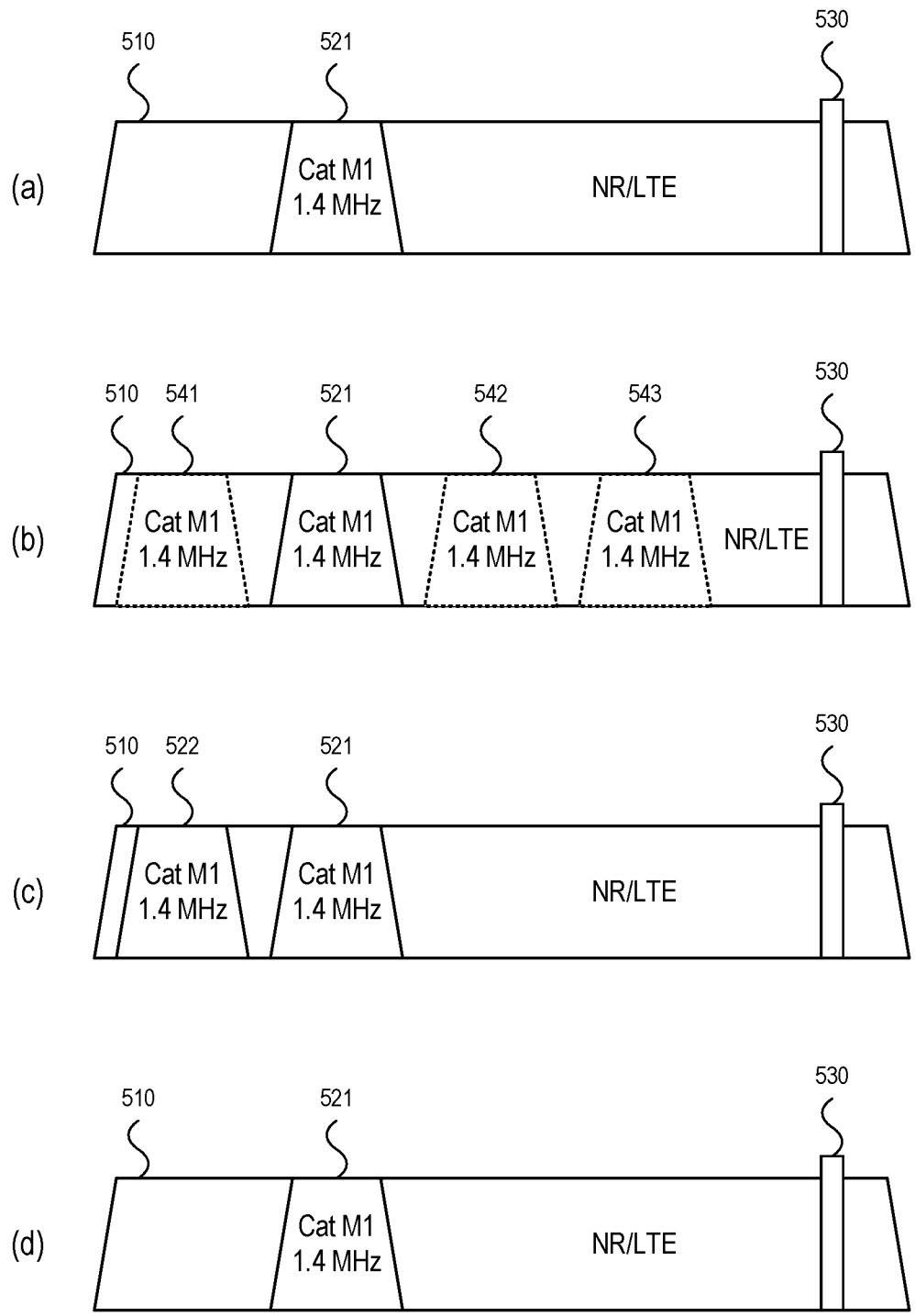
FIG. 5 illustrates exemplary in-band resource allocations in accordance with various aspects of the present disclosure.

One example of load balancing and dynamic allocation operations collectively performed by the setting module 311, the logic module 312, and the scheduling module 313 is illustrated in FIG. 5. At time (a) (e.g., an initial state), the access node 300 is communicating with one or more wireless devices in a wideband 510 with most of the frequency resources being allocated to LTE or NR communication, one carrier 521 of width 1.4 MHz (e.g., six PRBs) being allocated to Cat-M1 communication, and one blanked PRB 531. At time (b), the logic module 312 may determine that the first trigger criteria, previously set by the setting module 311, has been met. At this time, the logic module 312 may identify a second carrier for Cat-M1 communication by first identifying a plurality of candidate carriers 541, 542, 543, etc. (although only three are shown for ease of explanation). The portion of the wideband 510 which includes the blanked PRB 531 may be deemed as not satisfying the capability criteria. From among the candidate carriers 541, 542, 543 which have met the capability criteria, the logic module 312 may select the carrier having the lowest identifier (e.g., of the lowest frequency).

Thus, at time (c), the access node 300 communicates with connected Cat-M1 devices using both the original Cat-M1 carrier 521 as well as an additional Cat-M1 carrier 522, which as illustrated corresponds to candidate carrier 541. Subsequently, the logic module 312 may determine that the second trigger criteria, previously set by the setting module 311, has been met. Thus, the access node may revert to communication using only one Cat-M1 carrier as shown for time (d). Although FIG. 5 illustrates that the original carrier 521 has been retained, in other implementations the new carrier 522 may instead be retained. While not particularly illustrated in FIG. 5, the operations described with regard to time (b) may be repeated again at time (c) but before time (d), for example of the Cat-M1 utilization further increases and/or the LTE/NR utilization further decreases. As such, the access node 300 is not limited to a maximum of two Cat-M1 carriers and may instead allocate any number of additional Cat-M1 carriers as network conditions dictate. Thus, the access node may identify a third bandwidth portion (and/or fourth and additional portions) within the wideband and to schedule communications corresponding to the first communication mode over the first bandwidth portion, the second bandwidth portion, and the third bandwidth portion (and/or the fourth and additional portions).

The wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive communications from the wireless device via the wireless communication circuitry 330 and output communications and/or control signals or instructions to the wireless device via the wireless communication circuitry 330, thereby managing traffic and network resources. The access node 300 may include additional wireless communication circuitry elements, for example to communicate using additional frequencies and/or to provide connectivity for different RATs. The access node 300 may further include additional wired communication circuitry elements.

Figure 4:
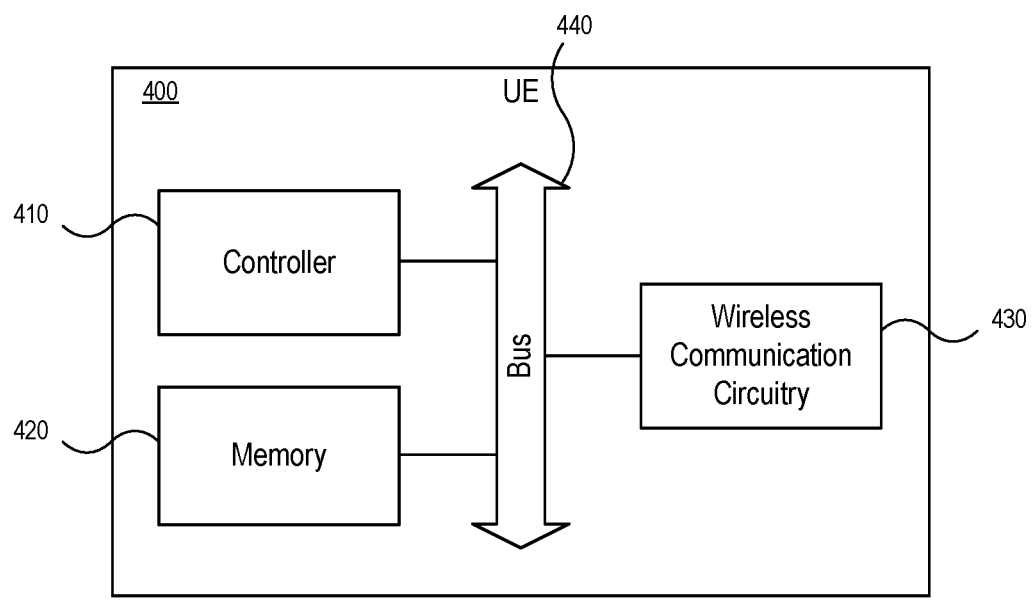
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or one or more of the wireless devices 250 shown in FIG. 2. As illustrated, the wireless device 400 includes a controller 410, a memory 420, a wireless communication circuitry 430, and a bus 440 through which the various elements of the wireless device 400 communicate with one another. The controller 410 includes various sub-modules or units to implement operations and processes in accordance with the present disclosure. For example, the controller 410 may include modules that (e.g., in response to commands or instructions from an access node) may cause the wireless device 400 to switch among various carriers. Alternatively, the controller 410 may load a module from the memory 420 (e.g., a software module) to switch among various carriers.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit communications to the access node via the wireless communication circuitry 430 and receive communications and/or control signals or instructions from the access node via the wireless communication circuitry 430. The wireless device 400 may include additional wireless communication circuitry elements, for example to communicate using different RATs or different frequency resources.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless device 250. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G Advanced, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links connecting the access node 230 to the 5G core 220 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, Ti, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G Advanced, or combinations thereof. The communication links may respectively be a direct link or might include various equipment, intermediate components, systems, and networks. The communication links may comprise many different signals sharing the same link.

The communication network 210, the access node 230, and/or the 5G core 220 may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a User Plane Function (UPF). Control plane NFs can provide one or more NFs based on a request-response or subscribe-notify model. In some implementations, the PCF implements the URSP manager. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 220. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 220, thereby terminating RAN control plane and UE traffic originating on either the N1 or N2 reference interface. In the 5G core 220, the functionality of the 4G Mobility Management Entity (MME) is decomposed into the AMF and the SMF. The AMF receives all connection and session related information from the UE using N1 and N2 interfaces, and is responsible for handling connection and mobility management tasks.

A Unified Data Repository (UDR) may also be present. The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 230 and the communication network 210.

Figure 6:
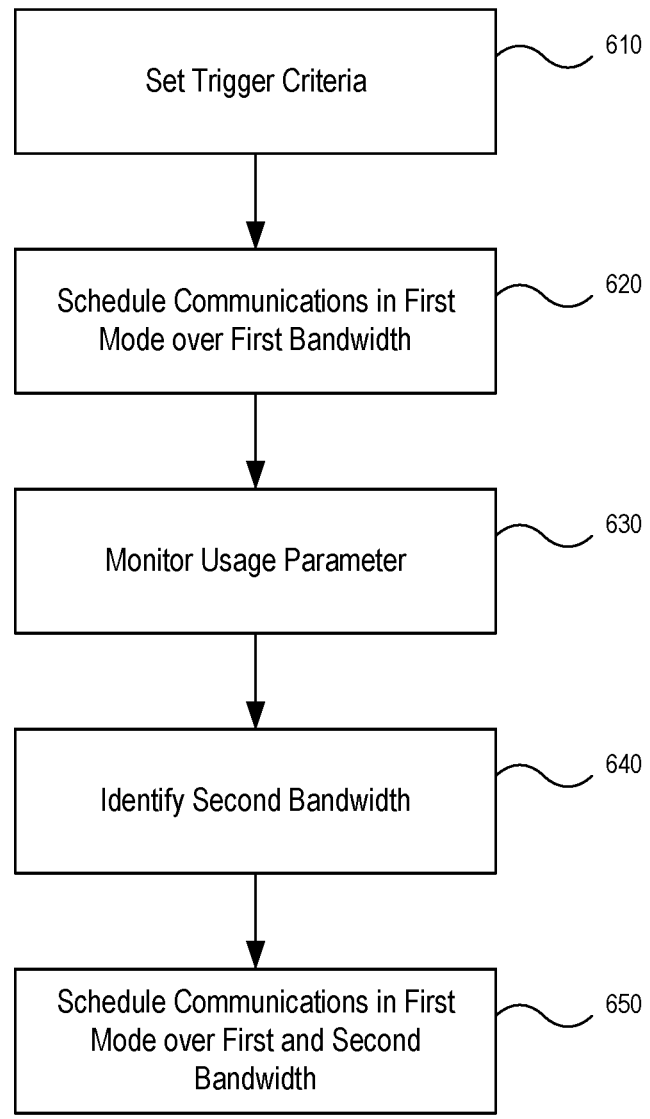
FIGS. 6-8 respectively illustrate exemplary process flows for managing resources in accordance with various aspects of the present disclosure.

FIG. 6 illustrates an exemplary process flow for managing bandwidth (i.e., for dynamically adjusting in-band carriers). In particular, FIG. 6 illustrates a method of managing network resources by adding in-band carriers for a communication mode. The operations of FIG. 6 will be described as being performed by the access node 300 for purposes of explanation. Generally, the process flow may be implemented using any access node that is configured to communicate over a wideband which includes a first bandwidth portion and is configured to communicate in both of a first communication mode (e.g., an IoT communication mode) and a second communication mode (e.g., a cellular communication mode). The process flow beings at operation 610 of setting a first trigger criteria for the access node.

The first trigger criteria may comprise a condition that a first number of devices connected to the access node using the first communication mode is greater than a first threshold and that a second number of devices connected to the access node using the second communication mode is less than a second threshold. In one particular example, the first trigger criteria may thus be met when the number of Cat-M1 UEs connected to the access node is relatively large and the number of LTE or NR UEs connected to the access node is relatively small. The first trigger criteria may additionally or alternatively comprise a condition that a first resource utilization in the first communication mode is greater than a first threshold and that a second resource utilization in the second communication mode is less than a second threshold. In one particular example, the first trigger criteria may thus be met when Cat-M1 resource utilization is relatively high and LTE or NR resource utilization is relatively low. The first trigger criteria may additionally or alternatively comprise a condition that a number of devices connected to the access node using a predetermined sub-mode of the first communication mode is greater than a first threshold and that a resource utilization in the second communication mode is less than a second threshold. In one particular example, the first trigger criteria may thus be met when a number of Cat-M1 users in CE ModeB is relatively high and LTE or NR resource utilization is relatively low.

At operation 620, the process flow includes scheduling communications corresponding to the first communication mode over the first bandwidth portion. Operation 620 may persist for any length of time, and may be performed in parallel with one or more of the remaining operations illustrated in FIG. 6 or other operations not illustrated.

Operation 630 includes monitoring a usage parameter in at least one of the first communication mode or the second communication mode. The usage parameter may include a number of devices connected to the access node using the first communication mode, a number of devices connected to the access node using the second communication mode, a resource utilization in the first communication mode, a resource utilization in the second communication mode, a number of devices connected to the access node using a predetermined sub-mode of the first communication mode, or combinations thereof. Operation 630 may include comparing the usage parameter to one or more trigger criteria (e.g., those trigger criteria described above with regard to operation 610) and outputting a determination indicating of the comparison result.

In response to a determination that the usage parameter corresponds to the first trigger criteria for at least a first predetermined amount of time, at operation 640 a second bandwidth portion within the wideband is identified. The identification may include identifying sub-operations of identifying a plurality of bandwidth portion candidates within the wideband which meet a capability criteria and selecting, as the second bandwidth portion, the bandwidth portion candidate from among the plurality of bandwidth portion candidates that satisfies a candidacy criteria. The capability criteria and/or the candidacy criteria may be different for DL and uplink UL bandwidth portions. For example, for DL traffic the capability criteria may include a condition that a bandwidth portion does not have PRB blanking or IoT in-band capabilities (e.g., NB-IoT in-band or Cat-M1 in-band) already defined; and the candidacy criteria may include a condition that the candidate bandwidth portion is the closest narrowband to a Cat-M1 narrowband that is already defined. In an example, for UL traffic the capability criteria may include a condition that a bandwidth portion does not have Cat-M1 in-band already defined; and the candidacy criteria may include a condition that the candidate bandwidth portion has the lowest narrowband index that does not collide with a wideband PUCCH or PRACH in a specific TTI.

Once the second bandwidth portion within the wideband has been identified from among the candidates, at operation 650 communications corresponding to the first communication mode are scheduled over the first bandwidth portion and the second bandwidth portion. As with operation 620, operation 650 may persist for any length of time, and may be performed in parallel with one or more of the remaining operations illustrated in FIG. 6 (e.g., continued monitoring of operation 630) or other operations not illustrated.

The operations of FIG. 6 need not necessarily be performed one after another in immediate sequence. For example, operation 610 may be performed in advance, for example during a network configuration operation and/or during startup of the access node. Subsequently, operations 620 and 630 may be performed continuously until operation 630 determines that the usage parameter corresponds to the first trigger criteria for at least the first predetermined period of time, at which point operations 640 and 650 may occur. Operations 640 and 650 may be repeated with regard to a third bandwidth in the event that the first trigger criteria is again met (e.g., if usage in the first communication mode continues to increase), thereby to identify the third bandwidth portion within the wideband and to schedule communications corresponding to the first communication mode over the first bandwidth portion, the second bandwidth portion, and the third bandwidth portion.

Figure 7:
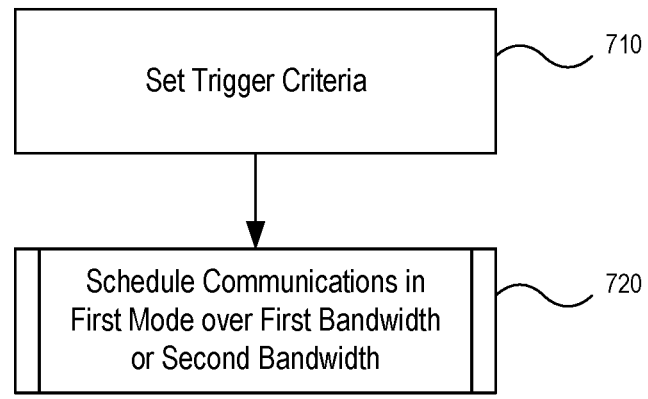

FIG. 7 illustrates another exemplary process flow for managing bandwidth (i.e., for dynamically adjusting in-band carriers). In particular, FIG. 7 illustrates a method of managing network resources by removing in-band carriers from a communication mode. The operations of FIG. 7 may be performed following the operations of FIG. 7, concurrently with operation 650, or at any time that multiple bandwidth portions have been allocated to communication in the first communication mode. The process flow beings at operation 710 of setting a second trigger criteria for the access node. Operation 710 may, in some implementations, be performed concurrently with operation 610 of FIG. 6.

The second trigger criteria may comprise a condition that a first number of devices connected to the access node using the first communication mode is less than a first threshold and that a second number of devices connected to the access node using the second communication mode is more than a second threshold. In one particular example, the second trigger criteria may thus be met when the number of Cat-M1 UEs connected to the access node is relatively small and the number of LTE or NR UEs connected to the access node is relatively large. The second trigger criteria may additionally or alternatively comprise a condition that a first resource utilization in the first communication mode is less than a first threshold and that a second resource utilization in the second communication mode is greater than a second threshold. In one particular example, the second trigger criteria may thus be met when Cat-M1 resource utilization is relatively low and LTE or NR resource utilization is relatively high. The second trigger criteria may additionally or alternatively comprise a condition that a number of devices connected to the access node using a predetermined sub-mode of the first communication mode is less than a first threshold and that a resource utilization in the second communication mode is more than a second threshold. In one particular example, the second trigger criteria may thus be met when a number of Cat-M1 users in CE ModeB is relatively low and LTE or NR resource utilization is relatively high.

The first trigger criteria and the second trigger criteria may be independent from one another, or may be related to one another. In an example in which the first and second trigger criteria are related to one another, they may be converses of one another. In other words, if the first trigger criteria includes the condition that the first number of devices connected to the access node using the first communication mode is greater than a first threshold and that the second number of devices connected to the access node using the second communication mode is less than a second threshold, then the second trigger criteria may include the condition that the first number of devices connected to the access node using the first communication mode is less than a first threshold and that the second number of devices connected to the access node using the second communication mode is more than a second threshold. In this example, the first and second thresholds for purposes of the first trigger criteria may be the same as or different than the first and second thresholds for purposes of the second trigger criteria. In the example in which the first and second thresholds are the same, the second trigger criteria may thus essentially comprise a condition that the first trigger criteria is no longer satisfied.

Figure 8:
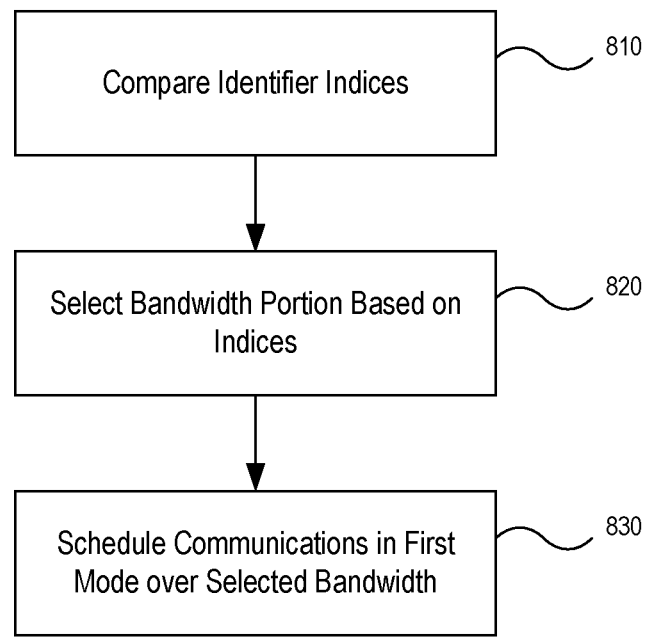

At operation 720, the process flow includes, generally, scheduling communications using one fewer bandwidth portion than previous. For example, if prior to operation 720 communications are scheduled over both of a first bandwidth portion and a second bandwidth portion, operation 720 comprises scheduling communications corresponding to the first communication mode over one of the first bandwidth portion or the second bandwidth portion. Operation 720 may include several sub-operations, examples of which are illustrated in FIG. 8. For example, operation 720 may include operation 810 of comparing identifier indices of the various bandwidth portions used for communications in the first communication mode prior to the beginning of operation 720. For example, the access node may compare an identifier index corresponding to the first bandwidth portion with an identifier index corresponding to the second bandwidth portion.

At operation 820, the access node may select a bandwidth portion (or portions) based on the comparison of indices. At operation 830, communications corresponding to the first communication mode are scheduled over the selected bandwidth portion (or portions). In one example, operation 820 may include selecting the bandwidth portion having the higher identifier index from among the first bandwidth portion and the second bandwidth portion. This example results, at operation 830 in a return to the original scheduling of operation 620. In another example, other bandwidth portion(s) may be selected such that the scheduling is different from that of operation 620. Operation 830 may persist for any length of time, and may be performed in parallel with one or more of the remaining operations illustrated in FIGS. 6-8 or other operations not illustrated.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network resources, comprising:
    setting a first trigger criteria for an access node, wherein the access node is configured to communicate over a wideband including a first bandwidth portion and is configured to communicate in both of a first communication mode and a second communication mode;
    scheduling communications in the first communication mode over the first bandwidth portion;
    monitoring a usage parameter in at least one of the first communication mode or the second communication mode; and
    in response to a first determination that the usage parameter corresponds to the first trigger criteria for at least a first predetermined amount of time:
        identifying a second bandwidth portion within the wideband, and
        scheduling communications corresponding to the first communication mode over the first bandwidth portion and the second bandwidth portion.

2. The method according to claim 1, wherein the first trigger criteria comprises a condition that a first number of devices connected to the access node using the first communication mode is greater than a first threshold and that a second number of devices connected to the access node using the second communication mode is less than a second threshold.

3. The method according to claim 1, wherein the first trigger criteria comprises a condition that a first resource utilization in the first communication mode is greater than a first threshold and that a second resource utilization in the second communication mode is less than a second threshold.

4. The method according to claim 1, wherein the first trigger criteria comprises a condition that a number of devices connected to the access node using a predetermined sub-mode of the first communication mode is greater than a first threshold and that a resource utilization in the second communication mode is less than a second threshold.

5. The method according to claim 1, wherein the operation of identifying includes:
   identifying a plurality of bandwidth portion candidates within the wideband which meet a capability criteria, and
   selecting, as the second bandwidth portion, the bandwidth portion candidate from among the plurality of bandwidth portion candidates that is closest in frequency to the first bandwidth portion.

6. The method according to claim 1, further comprising:
   setting a second trigger criteria for the access node; and
   after the first determination and in response to a second determination that the usage parameter corresponds to the second trigger criteria for at least a second predetermined amount of time, scheduling communications corresponding to the first communication mode over one of the first bandwidth portion or the second bandwidth portion.

7. The method according to claim 6, wherein the second trigger criteria comprises a condition that a first number of devices connected to the access node using the first communication mode is less than a first threshold and that a second number of devices connected to the access node using the second communication mode is more than a second threshold.

8. The method according to claim 6, wherein the second trigger criteria comprises a condition that a first resource utilization in the first communication mode is less than a first threshold and that a second resource utilization in the second communication mode is greater than a second threshold.

9. The method according to claim 6, wherein the second trigger criteria comprises a condition that a number of devices connected to the access node using a predetermined sub-mode of the first communication mode is less than a first threshold and that a resource utilization in the second communication mode is more than a second threshold.

10. The method according to claim 6, wherein the operation of scheduling communications corresponding to the first communication mode over one of the first bandwidth portion or the second bandwidth portion includes:
    comparing an identifier index corresponding to the first bandwidth portion with an identifier index corresponding to the second bandwidth portion,
    selecting the bandwidth portion having the higher identifier index from among the first bandwidth portion and the second bandwidth portion, and
    scheduling communications corresponding to the first communication mode over the selected bandwidth portion.

11. The method according to claim 1, wherein the first bandwidth portion is a narrowband.

12. The method according to claim 1, wherein the first communication mode is an Internet-of-Things (IoT) communication mode.

13. A system for managing network resources, comprising:
    an access node configured to communicate over a wideband including a first bandwidth portion and configured to communicate in both of a first communication mode and a second communication mode, the access node including at least one electronic processor configured to perform operations including:
       setting a first trigger criteria for the access node;
       scheduling communications in the first communication mode over the first bandwidth portion;
       monitoring a usage parameter in at least one of the first communication mode or the second communication mode; and
       in response to a first determination that the usage parameter corresponds to the first trigger criteria for at least a first predetermined amount of time:
          identifying a second bandwidth portion within the wideband, and
          scheduling communications corresponding to the first communication mode over the first bandwidth portion and the second bandwidth portion.

14. The system according to claim 13, wherein the first trigger criteria comprises a condition that a first number of devices connected to the access node using the first communication mode is greater than a first threshold and that a second number of devices connected to the access node using the second communication mode is less than a second threshold.

15. The system according to claim 13, wherein the first trigger criteria comprises a condition that a first resource utilization in the first communication mode is greater than a first threshold and that a second resource utilization in the second communication mode is less than a second threshold.

16. The system according to claim 13, wherein the first trigger criteria comprises a condition that a number of devices connected to the access node using a predetermined sub-mode of the first communication mode is greater than a first threshold and that a resource utilization in the second communication mode is less than a second threshold.

17. The system according to claim 13, further comprising:
    setting a second trigger criteria for the access node; and
    after the first determination and in response to a second determination that the usage parameter corresponds to the second trigger criteria for at least a second predetermined amount of time, scheduling communications corresponding to the first communication mode over one of the first bandwidth portion or the second bandwidth portion.

18. The system according to claim 17, wherein the second trigger criteria comprises a condition that the first trigger criteria is no longer satisfied.

19. The system according to claim 13, further comprising:
    setting a second trigger criteria for the access node; and
    after the first determination and in response to a second determination that the usage parameter corresponds to the second trigger criteria for at least a second predetermined amount of time:
       identifying a third bandwidth portion within the wideband, and
       scheduling communications corresponding to the first communication mode over the first bandwidth portion, the second bandwidth portion, and the third bandwidth portion.

20. The system according to claim 13, wherein a duration of the first predetermined amount of time is defined by an operator of the access node.

* * * * *